United States Patent
Cho (10) Patent No.: US 11,433,852 B2
(45) Date of Patent: Sep. 6, 2022

(54) REMOTE CONTROL SYSTEM FOR VEHICLE AND OPERATING METHOD THEREOF

(71) Applicant: HYUNDAI MOBIS CO., LTD., Seoul (KR)

(72) Inventor: Heung Rae Cho, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 366 days.

(21) Appl. No.: 16/801,643

(22) Filed: Feb. 26, 2020

(65) Prior Publication Data

US 2020/0269808 A1 Aug. 27, 2020

(30) Foreign Application Priority Data

Feb. 26, 2019 (KR) .................. 10-2019-0022269

(51) Int. Cl.
*B60R 25/24* (2013.01)
*H04W 4/40* (2018.01)
(Continued)

(52) U.S. Cl.
CPC ............ *B60R 25/24* (2013.01); *B60R 25/209* (2013.01); *G05D 1/0016* (2013.01); *G05D 1/0022* (2013.01); *G06F 3/017* (2013.01); *G06K 9/6262* (2013.01); *G06N 3/08* (2013.01); *G06V 40/168* (2022.01); *G06V 40/172* (2022.01); *H04L 9/0866* (2013.01); *H04L 9/3226* (2013.01);
(Continued)

(58) Field of Classification Search
CPC .... B60R 25/24; B60R 25/209; G05D 1/0016; G05D 1/0022; G06F 3/017; G06K 9/6262; G06V 40/168; G06V 40/172; G06V 20/59; H04L 9/0866; H04L 9/3226; H04L 63/0861; H04L 2463/082
See application file for complete search history.

(56) References Cited

U.S. PATENT DOCUMENTS 9,202,105 B1 * 12/2015 Wang ............... H04N 21/44008
10,386,835 B2 * 8/2019 Vogt ..................... G05D 1/0016
(Continued)

FOREIGN PATENT DOCUMENTS

| CN | 106681499 | 5/2017 |
|---|---|---|
| CN | 106945630 | 7/2017 |
| KR | 10-2017-0068869 | 6/2017 |

*Primary Examiner* — Mussa A Shaawat
(74) *Attorney, Agent, or Firm* — H.C. Park & Associates, PLC (57) ABSTRACT

A remote control system for a vehicle including: a user terminal; and a vehicle configured to transmit/receive information to/from the user terminal through a communication network. The vehicle performs first authentication on a user by comparing a captured image of the user to a reference image in response to an unlocking signal or start-up request signal received from the user terminal, and transmits second authentication pre-processing information to the user terminal, the second authentication pre-processing information being obtained by generating an encryption key from a feature vector extracted from the image of the user and encrypting unique information of the user. The user terminal performs second authentication on the user by decrypting the second authentication pre-processing information received from the vehicle with a decryption key stored therein.

10 Claims, 3 Drawing Sheets

(51) Int. Cl.
*G06N 3/08* (2006.01)
*G06F 3/01* (2006.01)
*G06K 9/62* (2022.01)
*G06K 9/00* (2022.01)
*H04L 29/06* (2006.01)
*G05D 1/00* (2006.01)
*H04L 9/08* (2006.01)
*B60R 25/20* (2013.01)
*H04L 9/32* (2006.01)
*H04L 9/40* (2022.01)
*G06V 40/16* (2022.01)

(52) U.S. Cl.
CPC ........... *H04L 63/0861* (2013.01); *H04W 4/40* (2018.02); *H04L 2463/082* (2013.01)

(56) References Cited

U.S. PATENT DOCUMENTS

| | | | |
|---|---|---|---|
| 10,585,430 B2 * | 3/2020 | Lavoie | G05D 1/0016 |
| 11,087,115 B2 * | 8/2021 | Baheti | G01S 7/35 |
| 2006/0219776 A1 * | 10/2006 | Finn | G06K 7/0043 235/380 |
| 2014/0040621 A1 * | 2/2014 | Klimke | H04W 12/08 713/171 |
| 2015/0033305 A1 * | 1/2015 | Shear | H04L 63/20 726/11 |
| 2016/0259037 A1 * | 9/2016 | Molchanov | G06V 40/28 |
| 2017/0057436 A1 * | 3/2017 | Dow | G06F 21/83 |
| 2017/0192428 A1 * | 7/2017 | Vogt | G05D 1/0257 |
| 2017/0244703 A1 | 8/2017 | Lee et al. | |
| 2017/0316621 A1 * | 11/2017 | Jefferies | B60R 25/045 |
| 2018/0046255 A1 * | 2/2018 | Rothera | G01S 7/412 |
| 2018/0218137 A1 * | 8/2018 | Park | G06F 21/45 |
| 2018/0232817 A1 * | 8/2018 | Isaacson | G06V 3/048 |
| 2018/0245395 A1 * | 8/2018 | Huggins | E05F 15/76 |
| 2019/0187265 A1 * | 6/2019 | Barbello | G06F 21/31 |
| 2019/0329733 A1 * | 10/2019 | Ahmad | H04W 12/06 |
| 2020/0234030 A1 * | 7/2020 | Baheti | B60R 25/2045 |

* cited by examiner

REMOTE CONTROL SYSTEM FOR VEHICLE AND OPERATING METHOD THEREOF

CROSS-REFERENCE TO RELATED APPLICATION

This application claims priority from and the benefit of Korean Patent Application No. 10-2019-0022269, filed on Feb. 26, 2019, which is hereby incorporated by reference for all purposes as if fully set forth herein.

BACKGROUND

Field

Exemplary embodiments of the present disclosure relate to a remote control system for a vehicle, which can strengthen the security of vehicle control through authentication between a user terminal and the vehicle, using user face and/or gesture recognition, and an operating method thereof.

Discussion of the Background

Face recognition technologies have been utilized in various fields. The face recognition technology which is most widely used among the face recognition technologies uses an authentication process of determining whether a newly input face image coincides with a specific face registered in advance.

Recently, a method of training a neural network through various sample images of faces in advance and recognizing the face of an input image using the trained neural network has been used as the method for recognizing the same face.

The related art is technical information which the present inventor has retained to derive the present disclosure or has acquired during the process of deriving the present disclosure. The related art is not necessarily a publicly known technique which is published to the public before the application of the present disclosure.

(Patent Document 1) Korean Patent Application Laid-Open No. 2017-0068869

The above information disclosed in this Background section is only for enhancement of understanding of the background of the invention and, therefore, it may contain information that does not constitute prior art.

SUMMARY

Exemplary embodiments of the present invention provide a remote control system for a vehicle, which can strengthen the security of vehicle control through authentication between a user terminal and the vehicle, using user face and/or gesture recognition, and an operating method thereof.

In an embodiment, a remote control system for a vehicle may include: a user terminal; and a vehicle configured to transmit/receive information to/from the user terminal is through a communication network. The vehicle may perform first authentication on a user by comparing a captured image of the user to a reference image in response to an unlocking signal or start-up request signal received from the user terminal, and transmit second authentication pre-processing information to the user terminal, the second authentication pre-processing information being obtained by generating an encryption key from a feature vector extracted from the image of the user and encrypting unique information of the user. The user terminal may perform second authentication on the user by decrypting the second authentication pre-processing information received from the vehicle with a decryption key stored therein.

When the first authentication on the user by the vehicle and the second authentication on the user by the user terminal succeed, a communication channel may be opened between the user terminal and the vehicle, and the vehicle may be unlocked or started up in response to the unlocking signal or the start-up request signal received from the user terminal.

When the first authentication on the user by the vehicle and the second authentication on the user by the user terminal succeed, a communication channel may be opened between the user terminal and the vehicle, and the vehicle may perform vehicle control corresponding to a gesture image of the user, captured by the vehicle, in the case that the gesture image of the user is compared to and coincides with vehicle control information stored in advance.

The user terminal may include one or more of a fob key, a smart watch and a smart phone.

In an embodiment, there is provided an operating method of a remote control system which includes a user terminal and a vehicle configured to transmit/receive information to/from the user terminal through a communication network. The operating method may include: performing, by the vehicle, first authentication on a user by comparing a captured image of the user to a reference image in response to an unlocking signal or start-up request signal received from the user terminal, and transmitting second authentication pre-processing information to the user terminal, the second authentication pre-processing information being obtained by generating an encryption key from a feature vector extracted from the image of the user and encrypting unique information of the user; and performing, by the user terminal, second authentication on the user by decrypting the second authentication pre-processing information received from the vehicle with a decryption key stored therein.

The operating method may further include: opening a communication channel between the user terminal and the vehicle, when the first authentication on the user by the vehicle and the second authentication on the user by the user terminal succeed; and unlocking or starting up the vehicle in response to the unlocking signal or the start-up signal received from the user terminal.

The operating method may further include: opening a communication channel between the user terminal and the vehicle, when the first authentication on the user by the vehicle and the second authentication on the user by the user terminal succeeded; and performing vehicle control corresponding to a gesture image of the user, captured in the vehicle, when the gesture image of the user is compared to and coincides with vehicle control information stored in advance.

The performing of the second authentication on the user may include performing, by the user terminal, the second authentication on the user by decrypting the second authentication pre-processing information received from the vehicle with the decryption key stored in the user terminal, wherein the user terminal includes one or more of a fob key, a smart watch and a smart phone.

In an embodiment, there are provided another method, another system, and a computer program capable of executing the method, in order to implement the method.

In accordance with the embodiments, the remote control system and the operating method can strengthen the security of vehicle control through authentication between the user terminal and the vehicle, through the user face and/or gesture recognition.

The effects of the present disclosure are not limited to those described above, and unmentioned other effects will be clearly understood by those skilled in the art from the following descriptions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

The advantages and characteristics of the present disclosure and a method for achieving the advantages and characteristics will be clarified through the following embodiments which will be described in detail with reference to the accompanying drawings. However, it should understood that the present disclosure is not limited to the following embodiments, can be embodied in various different forms, and includes all modifications, equivalents or substitutes which are included in the spirit and technical range of the present disclosure. The following embodiments are provided to complete the disclosure of the present disclosure, such that the scope of the present disclosure can be fully understood by those skilled in the art to which the present disclosure pertains. In describing the present disclosure, detailed descriptions for related publicly-known functions or configurations will be ruled out in order not to unnecessarily obscure subject matters of the present disclosure.

The terms used in this application are only used to describe a specific embodiment, and not intended to limit the present disclosure. The terms of a singular form may include plural forms unless referred to the contrary. In this specification, it should be understood that the meaning of "include" or "have" specifies a property, a number, a step, a process, an element, a component, or combinations thereof, but does not exclude in advance one or more other properties, numbers, steps, processes, elements, components, or combinations thereof. The terms such as first and second may be used to describe various elements, but the elements should not be limited by the terms. The terms are used only to distinguish one element from another element. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, embodiments of the present disclosure will be described in detail with reference to the accompanying drawings. In the following descriptions with reference to the accompanying drawings, the same or corresponding elements will be denoted by like reference numerals, and the overlapping descriptions thereof will be omitted.

Figure 1:
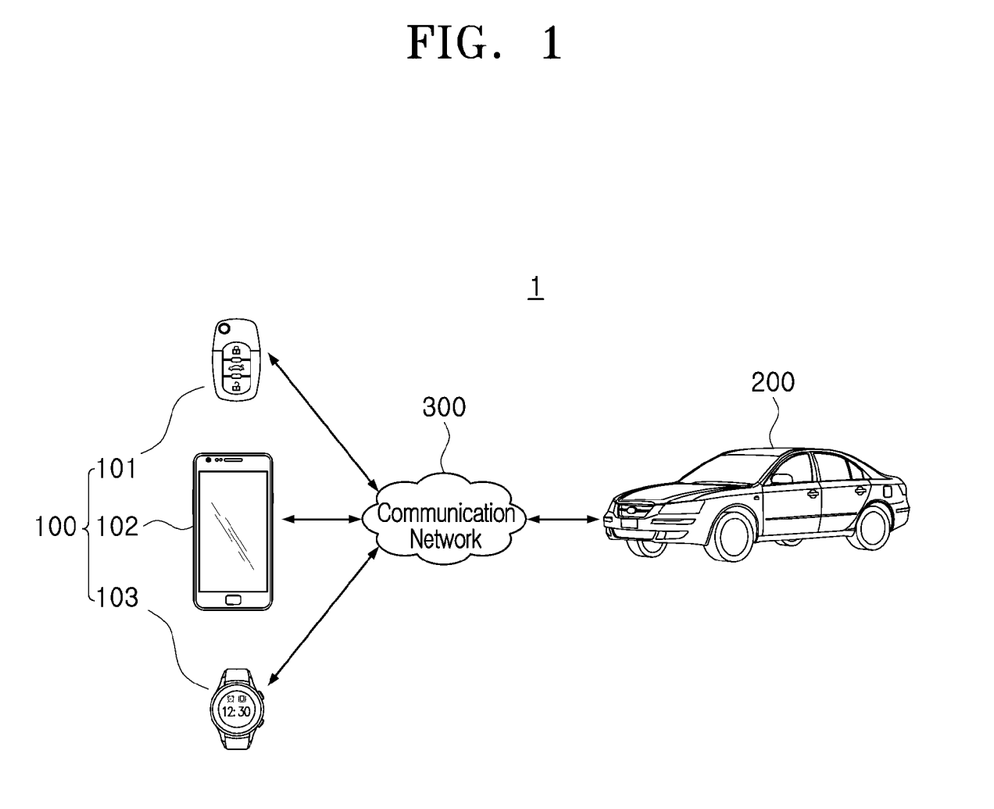
FIG. 1 is a diagram schematically illustrating a remote control system for a vehicle in accordance with an embodiment of the present disclosure.

FIG. 1 is a diagram schematically illustrating a remote control system for a vehicle in accordance with an embodiment of the present disclosure. Referring to FIG. 1, the remote control system 1 for a vehicle may include a user terminal 100, a vehicle 200 and a communication network 300.

The user terminal 100 may be a fob key 101, a smart phone 102, a notebook, a tablet PC, a smart TV, a mobile phone, a PDA (Personal Digital Assistant), a laptop computer, a media player, a micro server, a GPS (Global Positioning System), an e-book terminal, a digital broadcasting terminal, a navigation system, a kiosk, an MP3 player, a digital camera, a home appliance or other mobile or non-mobile computing devices, which a user operates to remotely control the vehicle 200. However, the user terminal 100 is not limited thereto. Furthermore, the user terminal 100 may be a wearable terminal such as a smart watch 103, glasses, a hair band or a ring, which has a communication function and a data processing function. The user terminal 100 is not limited to the above-described examples, and a terminal capable of performing web browsing may be employed without limitation.

The vehicle 200 may transmit/receive information to/from the user terminal 100 through the communication network 300. In the present embodiment, the vehicle 200 may include a three or more-wheel vehicle which is driven and stopped by control of a driver after one or more passengers are seated in the vehicle, or an autonomous vehicle which recognizes and determines a surrounding environment (obstacle or route) according to a program inputted in advance or for itself without passengers on the vehicle, and automatically runs, stops, turns, accelerates or decelerates.

The communication network 300 may indicate a communication network which connects the user terminal 100 and the vehicle 200 and provides a connection path to transmit/receive predetermined information. For example, the communication network 300 may include wired networks such as LANs (Local Area Networks), WANs (Wide Area Networks), MANs (Metropolitan Area Networks) and ISDNs (Integrated Service Digital Networks) or wireless networks such as wireless LANs, CDMA, Bluetooth and satellite communications. However, the present disclosure is not limited thereto. The communication network 300 may transmit/receive information through near field communication and/or long distance communication. The near field communication may include Bluetooth, RFID (Radio Frequency Identification), IrDA (Infrared Data Association), UWB (Ultra-WideBand), ZigBee and Wi-Fi (Wireless Fidelity), and the long distance communication may include CDMA (Code Division Multiple Access), FDMA (Frequency Division Multiple Access), TDMA (Time Division Multiple Access), OFDMA (Orthogonal Frequency Division Multiple Access) and SC-FDMA (Single Carrier Frequency Division Multiple Access).

The vehicle 200 may perform primary authentication on a user by comparing an image of the user to a reference image, the image being captured in response to an unlocking signal or start-up request signal received from the user terminal 100. Then, the vehicle 200 may transmit secondary authentication pre-processing information to the user terminal 100, the secondary authentication pre-processing information being obtained by generating an encryption key from a feature vector extracted from the image of the user and encrypting unique information of the user with the encryption key.

The user terminal 100 may perform secondary authentication on the user by decrypting the secondary pre-processing information received from the vehicle 200 with a decryption key stored therein.

When the primary authentication on the user by the vehicle 200 and the secondary authentication on the user by the user terminal 100 succeed, a communication channel between the user terminal 100 and the vehicle 200 may be opened, and the vehicle 200 may be unlocked or started up in response to the unlocking signal or the start-up request signal from the user terminal 100.

In a selective embodiment, when the primary authentication on the user by the vehicle 200 and the secondary authentication on the user by the user terminal 100 succeed, the communication channel may be opened between the user terminal 100 and the vehicle 200. Then, when a gesture image of the user, captured by the vehicle 200, and vehicle control information stored in advance are compared to each other and coincide with each other, vehicle control corresponding to the gesture image of the user may be performed.

Figure 2:
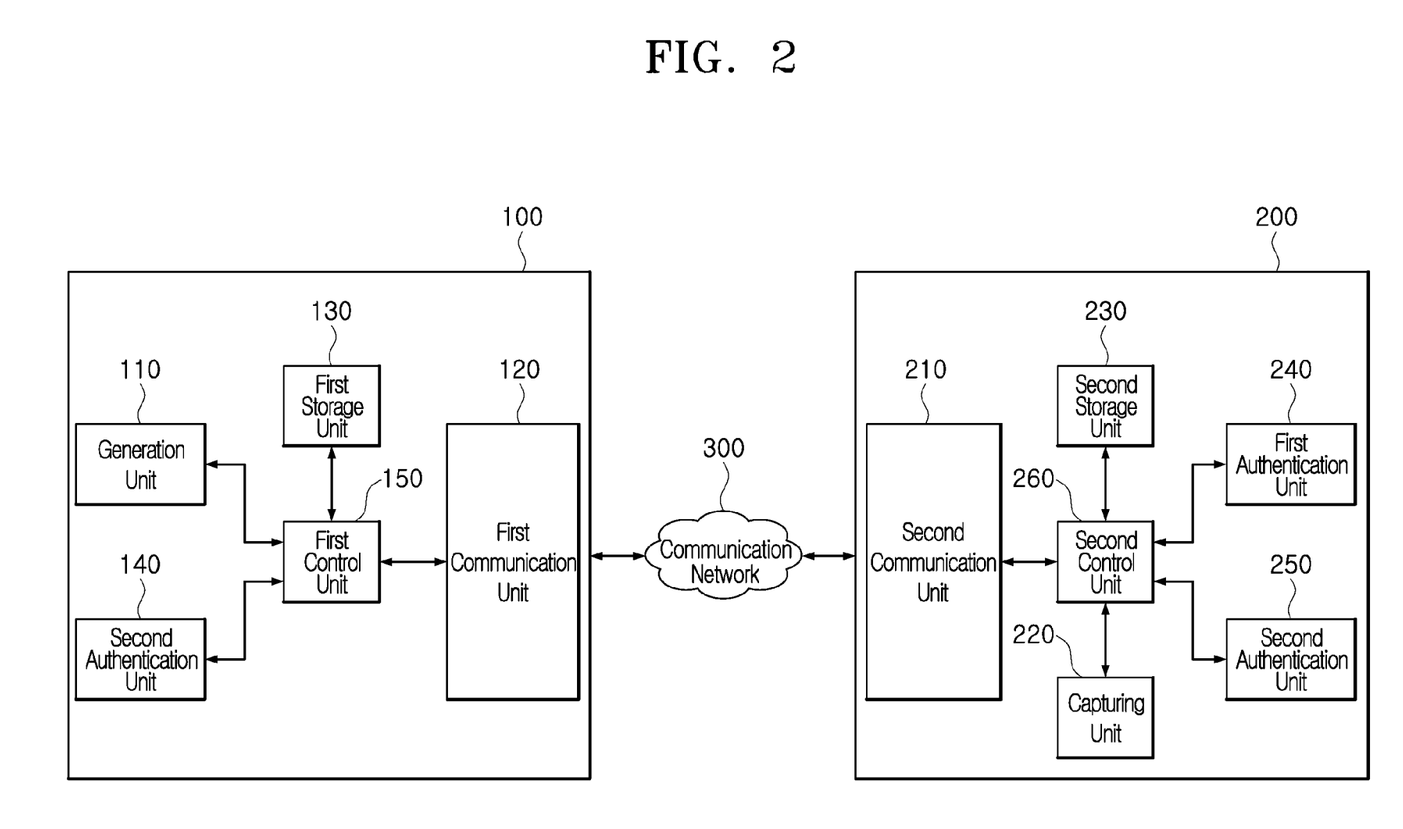
FIG. 2 is a diagram schematically illustrating the detailed configurations of the vehicle and a user terminal of the remote control system for a vehicle in FIG. 1.

FIG. 2 is a diagram schematically illustrating the detailed configurations of the vehicle and a user terminal of the remote control system for a vehicle in FIG. 1. Referring to FIG. 2, the user terminal 100 may include a generation unit 110, a first communication unit 120, a first storage unit 130, a second authentication unit 140 and a first control unit 150, and the vehicle 200 may include a second communication unit 210, a capturing unit 220, a second storage unit 230, a first authentication unit 240, a second authentication pre-processing unit 250 and a second control unit 260.

First, the user terminal 100 will be described as follows. The generation unit 110 may generate the unlocking signal for unlocking the vehicle 200 or the start-up request signal for starting up the vehicle 200. The generation unit 110 may receive an input signal of a button (not illustrated), which can be inputted by the user, and receive the unlocking signal or the start-up request signal. For example, the button may include an unlocking key, a start-up key and the like in the case of the fob key 101, and include a touchable unlocking menu, touchable start-up menu and the like in the case of the smart phone 102 or the smart watch 103.

The first communication unit 120 may transmit the unlocking signal or the start-up request signal, generated by the generation unit 110, to the vehicle 200 through the communication network 300, and receive second authentication pre-processing information from the vehicle 200.

The first storage unit 130 may store decryption key information with which the password of the second authentication pre-processing information received from the vehicle 200 can be decrypted. In the present embodiment, the decryption key may be identical with the encryption key which is used when the vehicle 200 generates the second authentication pre-processing information. Furthermore, after the primary and secondary authentications on the user are performed, vehicle control information corresponding to user gesture information may be stored in the first storage unit 130. The vehicle control information corresponding to the user gesture information may include opening the trunk of the vehicle 200 when the user clenches his/her fist or opening a door of the vehicle 200 when the user unfolds palm, for example.

The first storage unit 130 may include magnetic storage media or flash storage media, but the present disclosure is not limited thereto. The first storage unit 130 may include an embedded memory and/or external memory. For example, the first storage unit 130 may include a volatile memory such as a DRAM, SRAM or SDRAM, a nonvolatile memory such as an OTPROM (one time programmable ROM), PROM, EPROM, EEPROM, mask ROM, flash ROM, NAND flash memory or NOR flash memory, a flash drive such as an SSD, CF (Compact Flash) card, SD card, micro-SD card, mini-SD card, Xd card or memory stick, or a storage device such as an HDD.

The second authentication unit 140 may perform second authentication (secondary authentication) on the user by decrypting the second authentication pre-processing information received from the vehicle 200 through the first communication unit 120 with the decryption key stored in the first storage unit 130. The second authentication unit 140 may receive the second authentication pre-processing information from the vehicle 200 and perform the second authentication, only when first authentication which will be described below is successfully performed. That is, when the second authentication pre-processing information is decrypted with the decryption key, the second authentication unit 140 may transmit a user authentication success signal to the vehicle 200 through the first communication unit 120 and the communication network 300. When the user authentication success signal is transmitted to the vehicle 200, a separate communication channel may be allocated between the user terminal 100 and the vehicle 200. Then, the user terminal 100 and the vehicle 200 may transmit/receive information through the separate communication channel. However, when the second authentication pre-processing information is not decrypted with the decryption key, the second authentication unit 140 may transmit a user authentication fail signal to the vehicle 200 through the first communication unit 120 and the communication network 300. When the user authentication fail signal is transmitted to the vehicle 200, no separate communication channel is allocated between the user terminal 100 and the vehicle 200. Thus, information cannot be transmitted/received through a separate communication channel.

The first control unit 150 may control the entire operations of the user terminal 100, which are involved with the remote vehicle control. The first control unit 150 may include all types of devices capable of processing data, like a processor. Here, 'processor' may indicate a data processing device embedded in hardware and having a circuit which is physically structured to perform a function expressed as a code or command included in a program, for example. Examples of the data processing device embedded in hardware may include processing devices such as a microprocessor, CPU (Central Processing Unit), processor core, multiprocessor, ASIC (Application-Specific Integrated Circuit) and FPGA (Field Programmable Gate Array), but the present disclosure is not limited thereto.

Next, the vehicle 200 will be described as follows. The second communication unit 210 may receive the unlocking signal or the start-up request signal from the user terminal 100, and transmit the second authentication pre-processing information to the user terminal 100.

When the second communication unit 210 receives the unlocking signal or the start-up request signal from the user terminal 100, the second control unit 260 may operate the capturing unit 220. The capturing unit 220 may capture an image of the user around the vehicle or specifically a face image of the user. The capturing unit 220 may include a camera (not illustrated). The camera may capture a face image of the user using a COMS (Complementary Metal-Oxide Semiconductor) module or CCD (Charge Coupled Device) module (not illustrated). The camera may include an image signal processor (not illustrated) installed therein, and the image signal processor can reduce noise of captured image frames, and perform image signal processing for image quality enhancement, such as gamma correction, color filter array interpolation, color matrix, color correction and color enhancement.

The second storage unit 230 may store reference user face image information for primarily authenticating the user, the encryption key for generating the second authentication pre-processing information, and the vehicle control information corresponding to the user gesture information. In the present embodiment, the encryption key may be identical with the decryption key which the user terminal 100 uses to perform the second authentication.

The first authentication unit 240 may compare the face image information of the user, captured by the capturing unit 220, to the reference user face image information stored in the second storage unit 230, and determine that the first authentication (primary authentication) on the user succeeded, when there is face image information coinciding with the face image information of the user. The first authentication unit 240 may compare the face image information of the user, captured by the capturing unit 220, to the reference user face image information stored in the second storage unit 230, determine that the first authentication on the user failed, when there is no face image information coinciding with the face image information of the user, and then end the authentication process.

The second authentication pre-processing unit 250 may generate the encryption key by extracting a feature vector from the face image information of the user in response to the success in the first authentication on the user, and performing DNN (Deep Neural Network) learning on the feature vector, the feature vector being obtained by expressing feature points of the face (ex, the shape of the eyes, the shape of the nose, the shape of the mouth, a crying face, a smiling face and a side face) as another dimension of information instead of image information. The DNN, which is one field of deep learning based on machine learning, may indicate machine learning that attempts high-level abstraction through a combination of various non-linear transformation techniques. Furthermore, the DNN may be described as one field of the machine learning that teaches a computer to learn a human thinking method, within a large scale. The DNN which is an artificial neural network composed of a plurality of hidden layers between an input layer and an output layer may be used for modeling complex non-linear relationships. Since the DNN learning is already publicly known, the detailed descriptions thereof will be omitted herein.

The second authentication pre-processing unit 250 may generate the second authentication pre-processing information by encrypting user information with the generated encryption key, and transmit the second authentication pre-processing information to the user terminal 100 through the second communication unit 210.

The second control unit 260 may control the entire operations of the vehicle 200, which are involved with the remote vehicle control. The second control unit 260 may include one or more processors (not illustrated) installed therein. Furthermore, the second control unit 260 may be implemented as an array of a plurality of logic gates or a combination of a general-purpose microprocessor and a memory for storing a program which can be executed in the microprocessor. Furthermore, it is obvious to those skilled in the art to which the present embodiment belongs that the second control unit 260 can be implemented in another type of hardware.

When the primary authentication on the user by the vehicle 200 and the secondary authentication on the user by the user terminal 100 succeed, a communication channel between the user terminal 100 and the vehicle 200 may be opened, and the vehicle 200 may be unlocked or started up in response to the unlocking signal or the start-up request signal received from the user terminal 100. When the gesture image of the user, captured by the vehicle 200, is compared to and coincides with the vehicle control information stored in advance, the vehicle control corresponding to the gesture image of the user may be performed.

Figure 3:
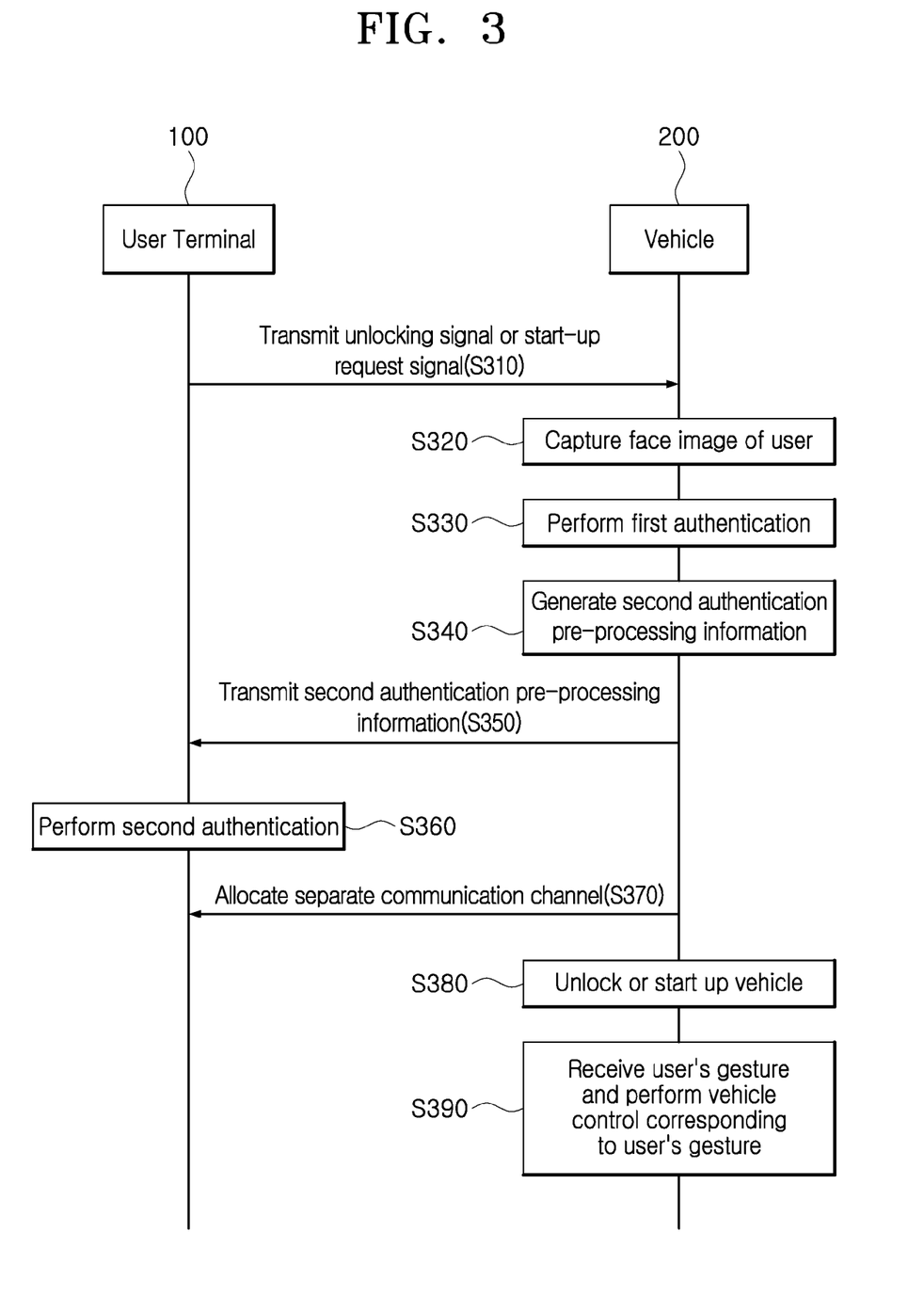
FIG. 3 is a flowchart illustrating an operating method of a remote control system for a vehicle in accordance with an embodiment of the present disclosure.

FIG. 3 is a flowchart illustrating an operating method of a remote control system for a vehicle in accordance with an embodiment of the present disclosure. In the following description, the descriptions of overlapping contents with those of FIGS. 1 and 2 will be omitted.

Referring to FIG. 3, the user terminal 100 transmits an unlocking signal or start-up request signal to the vehicle 200 through the communication network 300 in step S310.

In step S320, the vehicle 200 receiving the unlocking signal or the start-up request signal captures a face image of a user around the vehicle.

In step S330, the vehicle 200 performs first authentication by comparing the captured face image information of the user to the reference user face image information stored in advance, and determines that the first authentication succeeded, when user face image information coinciding with the captured face image information of the user is present in the reference user face image information stored in advance.

In step S340, when the first authentication succeeded, the vehicle 200 generates second authentication pre-processing information by extracting a feature vector from the face image information of the user, generating an encryption key by performing DNN on the feature vector, and encrypting user information with the generated encryption key.

In step S350, the vehicle 200 transmits the generated second authentication pre-processing information to the user terminal 100 through the communication network 300.

In step S360, the user terminal 100 performs second authentication on the user by decrypting the second authentication pre-processing information received from the vehicle 200 with a decryption key stored therein.

In step S370, when the second authentication pre-processing information is decrypted with the decryption key, a separate communication channel is allocated between the user terminal 100 and the vehicle 200 which determined that the second authentication on the user succeeded. When the second authentication succeeded, the user terminal 100 may transmit a second authentication success signal to the vehicle 200, and the vehicle 200 may transmit a response signal to the user terminal 100, the response signal indicating that the second authentication success signal was received. Then, the separate communication channel may be allocated between the user terminal 100 and the vehicle 200.

In step S380, the vehicle 200 is unlocked or started up in response to the unlocking signal or the start-up request signal received from the user terminal 100.

In step S390, the vehicle 200 compares a gesture image of the user, captured in the vehicle 200, to vehicle control information stored in advance. When the gesture image of the user coincides with the vehicle control information stored in advance, the vehicle 200 performs vehicle control corresponding to the gesture image of the user.

The embodiments described in this specification may be implemented with a method or process, a device, a software program, a data stream or a signal, for example. Although the embodiments have been discussed in a single implementation (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device. The processor includes a communication device such as a computer, a cell phone, a personal digital assistant (PDA) and another device, which can facilitate communication of information between an end user and the processor.

The above-described device may be implemented as a hardware component, a software component and/or a combination of the hardware component and the software component. For example, the device and the components which have been described in the present embodiments may be implemented by one or more general-purpose computers or special-purpose computers, such as a processor, a controller, an ALU (Arithmetic Logic Unit), a digital signal processor, a microcomputer, an FPGA (Field Programmable Gate Array), a PLU (Programmable Logic Unit), a microprocessor or any other devices which can execute an instruction or respond. The processing device may execute an OS (Operating System) and one or more software applications which are performed on the OS. The processing device may access, store, manipulate, process and generate data in response to the execution of software. In a certain case, it may be described that one processing device is used, for convenience of understanding. However, it is obvious to those skilled in the art that the processing device may include a plurality of processing elements and/or various types of processing elements. For example, the processing device may include a plurality of processors or one processor and one controller. Furthermore, the processing device may have another processing configuration such as a parallel processor.

Software may include a computer program, a code, an instruction or combinations of one or more thereof, and constitute the processing device to operate as desired or independently or collectively command the processing device. The software and/or data may be permanently or temporarily embodied in a certain type of machine, a component, a physical device, virtual equipment, a computer storage medium or device, or a transmitted signal wave, in order to be analyzed by the processing device or to provide an instruction or data to the processing device. The software may be distributed on computer systems connected through a network, and stored or executed through distributed methods. The software and data may be stored in one or more computer-readable recording media.

The method in accordance with the present embodiment may be implemented as a program instruction which can be executed through various computer units, and recorded into a computer readable medium. The computer readable medium may include a program instruction, a data file and a data structure either alone or a combination thereof. The program instruction recorded in the medium may be a program instruction which is specifically designed or configured for the present embodiments, or publicly known to or available for those skilled in the computer software field. Examples of the computer readable recording media include magnetic media such as a hard disk, floppy disk and magnetic tape, optical media such as CD-ROM and DVD, magneto-optical media such as a floptical disk, and hardware devices such as ROM, RAM and flash memory, which are specifically configured to store and execute a program instruction.

Examples of the program instruction include not only a machine language code which is created by a compiler, but also a high-level language code which can be executed by a computer through an interpreter or the like. The above-described hardware device may be configured to operate as one or more software modules in order to perform the operations of the present embodiment, and vice versa.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A remote control system for a vehicle, comprising:
   a user terminal; and
   a vehicle configured to transmit/receive information to/from the user terminal through a communication network,
   wherein:
   the vehicle performs first authentication on a user by comparing a captured image of the user to a reference image in response to an unlocking signal or a start-up request signal received from the user terminal, and transmits second authentication pre-processing information to the user terminal, the second authentication pre-processing information being obtained by generating an encryption key from a feature vector extracted from the image of the user and encrypting unique information of the user; and the user terminal performs second authentication on the user by decrypting the second authentication pre-processing information received from the vehicle with a decryption key stored therein.

2. The remote control system of claim 1, wherein, in response to success of the first authentication on the user by the vehicle and success of the second authentication on the user by the user terminal, a communication channel is opened between the user terminal and the vehicle, and the vehicle is unlocked or started up in response to the unlocking signal or the start-up request signal received from the user terminal.

3. The remote control system of claim 1, wherein, in response to success of the first authentication on the user by the vehicle and success of the second authentication on the user by the user terminal, a communication channel is opened between the user terminal and the vehicle, and the vehicle performs vehicle control corresponding to a gesture image of the user, captured by the vehicle, in the case that the gesture image of the user is compared to and coincides with vehicle control information stored in advance.

4. The remote control system of claim 1, wherein, in response to success of the first authentication, the vehicle generates the second authentication pre-processing information by extracting a feature vector from the face image information of the user, generating an encryption key by performing DNN (Deep Neural Network) learning on the feature vector, and encrypting user information with the generated encryption key.

5. The remote control system of claim 1, wherein the user terminal comprises at least one of a fob key, a smart watch, and a smart phone.

6. A method of operating a remote control system, the system including a user terminal and a vehicle configured to transmit/receive information to/from the user terminal through a communication network, the method comprising:

performing, by the vehicle, first authentication on a user by comparing a captured image of the user to a reference image in response to an unlocking signal or start-up request signal received from the user terminal, and transmitting second authentication pre-processing information to the user terminal, the second authentication pre-processing information being obtained by generating an encryption key from a feature vector extracted from the image of the user and encrypting unique information of the user; and performing, by the user terminal, second authentication on the user by decrypting the second authentication pre-processing information received from the vehicle with a decryption key stored therein.

7. The method of claim 6, further comprising:

opening a communication channel between the user terminal and the vehicle in response to success of the first authentication on the user by the vehicle and success of the second authentication on the user by the user terminal; and unlocking or starting up the vehicle in response to the unlocking signal or the start-up signal received from the user terminal.

8. The method of claim 6, further comprising:

opening a communication channel between the user terminal and the vehicle in response to success of the first authentication on the user by the vehicle and success of the second authentication on the user by the user terminal; and performing vehicle control corresponding to a gesture image of the user, captured in the vehicle, whenever the gesture image of the user is compared to and coincides with vehicle control information stored in advance.

9. The method of claim 6, wherein, in response to success of the first authentication, the transmitting of the second authentication pre-processing information to the user terminal comprises generating the second authentication pre-processing information by extracting a feature vector from the face image information of the user, generating an encryption key by performing DNN learning on the feature vector, and encrypting user information with the generated encryption key.

10. The method of claim 6, wherein:

the performing of the second authentication on the user comprises performing, by the user terminal, the second authentication on the user by decrypting the second authentication pre-processing information received from the vehicle with the decryption key stored in the user terminal; and the user terminal comprises at least one of a fob key, a smart watch, and a smart phone.

* * * * *